United States Patent [19]
Mallozzi et al.

[11] Patent Number: 4,484,339
[45] Date of Patent: Nov. 20, 1984

[54] PROVIDING X-RAYS

[75] Inventors: Philip J. Mallozzi, Delaware; Harold M. Epstein, Columbus, both of Ohio

[73] Assignee: Battelle Development Corporation, Columbus, Ohio

[21] Appl. No.: 396,980

[22] Filed: Jul. 9, 1982

Related U.S. Application Data

[63] Continuation-in-part of Ser. No. 232,774, Feb. 9, 1981, abandoned.

[51] Int. Cl.[3] .......................... G01T 1/36; G01T 7/00; G01N 23/20; H01J 39/02

[52] U.S. Cl. ........................................ 378/82; 378/34; 378/49; 378/53; 378/119

[58] Field of Search ..................... 378/119, 34, 82, 84, 378/83, 49, 53; 250/441.1, 305

[56] References Cited

U.S. PATENT DOCUMENTS

| | | | |
|---|---|---|---|
| 2,899,556 | 8/1959 | Schopper et al. | 250/441.1 |
| 2,908,821 | 10/1959 | Schumacher | 219/121 EQ |
| 3,585,349 | 6/1971 | Kalbfell | 219/121 EQ |
| 4,185,202 | 1/1980 | Dean et al. | 378/34 |

FOREIGN PATENT DOCUMENTS

| | | | |
|---|---|---|---|
| 58137 | 8/1982 | European Pat. Off. | 378/34 |

*Primary Examiner*—Alfred E. Smith
*Assistant Examiner*—T. N. Grigsby
*Attorney, Agent, or Firm*—Philip M. Dunson

[57] ABSTRACT

Apparatus for providing X-rays (11) to an object (12) in air. A lens (13) directs energy (14) from a laser (27) onto a target (15) to produce X-rays (11) of a selected spectrum and intensity. A substantially fluid-tight first enclosure (16) around the target (15) has a pressure therein substantially below atmospheric pressure. An adjacent substantially fluid-tight second enclosure (18) contains helium (24) at about atmospheric pressure. A wall (19) has an opening (20) large enough to permit X-rays (11) to pass through and yet small enough that gas (21) can be evacuated from the first enclosure (16) at least as fast as it enters through the opening (20) at the desired pressure. Intermediate enclosures (34, 34') at logarithmically increasing air pressures have similar openings (20', 20'') in line with the opening (20) and a transparent portion (36) in the near wall (35) of the second enclosure (18). The target (15) is located close to the opening (20) and emits a substantial portion of the X-rays (11) through the opening (20) and (via 20',20'',36) on toward the far wall (22) of the second enclosure (18) having a portion (25) that is highly transparent to them, so that the object (12) to which the X-rays (11) are to be provided may be located outside the second enclosure (18) and adjacent thereto and thus receive the X-rays (11) substantially unimpeded by air or other undesired intervening matter.

35 Claims, 3 Drawing Figures

PROVIDING X-RAYS

This application is a continuation-in-part of our co-pending application Ser. No. 232,774, filed Feb. 9, 1981, now abandoned.

FIELD

This invention relates to apparatus for providing X-rays to an object that may be in an ordinary environment such as air at approximately atmospheric pressure.

Apparatus according to the present invention is especially useful for applications wherein it is expensive, time consuming, or otherwise inconvenient to move objects that are to receive soft X-rays into and out of a special environment, such as a vacuum chamber in which the X-rays are produced. Typical applications of this type include laser produced X-ray systems for high resolution lithography, for extended X-ray absorption fine structure (EXAFS) spectroscopy, and for X-ray microscopy.

BACKGROUND

X-rays usually are produced in a vacuum, but for many purposes it is desirable to apply them in air. For soft X-rays, especially those having photon energies of less than about 5 keV, a problem arises in bringing the X-rays from the vacuum into air, because a window that is thick enough and strong enough to withstand the pressure difference between the vacuum and the air is opaque to the X-rays, except in very small windows. The problem is especially serious in X-ray lithography, where it is desirable to illuminate large areas.

The present invention provides simple, inexpensive, convenient means for overcoming the problem.

It is shown in U.S. Pat. No. 4,058,486, Nov. 15, 1977, of P. J. Mallozzi, H. M. Epstein, R. G. Jung, D. C. Applebaum, B. P. Fairand, and W. J. Gallagher, for Producing X-rays, that an intense point source of X-rays can be generated by focusing a laser beam onto a solid target. Neodymium laser light focused onto a solid slab target has been converted into X-rays with an efficiency greater than 25 percent, with several tens of joules of X-rays emanating from an essentially point source (about 100 microns diameter) in a nanosecond. The X-ray pattern produced with iron targets irradiated with about 100-joule laser pulses at a 45 degree angle of incidence is substantially omnidirectional. The conversion efficiency of greater than 25 percent refers to X-rays which are radiated away from the slab and pass perpendicularly through 3000 Angstroms of plastic (paraline) coated with 2000 Angstroms of aluminum. This conversion efficiency is thus a lower bound and refers only to the portion of the spectrum above about 300 electron volts. Most of the observed X-rays lie between about 0.3 and 1.5 keV, with a small but useful fraction having energies as high as 10 to 100 keV. In a densitometer tracing of a bent crystal spectrograph taken with a KAP crystal, the radiation appears to be mostly lines in the spectral interval of about 0.7 to 1.2 keV. The unusual sharpness of the spectral detail is due to the tiny dimensions of the source. This novel point source of X-rays provides a spectrum tuneable throughout a range of about 0.1 to 100 keV.

Apparatus according to the present invention typically employs X-ray producing means of the type described above. It may, however, use other somewhat similar means, such as equipment that uses an electron beam, rather than a laser beam, for producing the X-rays.

DISCLOSURE

Typical apparatus according to the present invention for providing X-rays to an object that may be in an ordinary environment such as air at approximately atmospheric pressure comprises means for directing energy onto a target to produce X-rays of a selected spectrum and intensity at the target, a substantially fluid-tight first enclosure around the target, means for reducing the quantity, and thus the pressure, of gas in the first enclosure to maintain the pressure therein substantially below atmospheric pressure, a substantially fluid-tight second enclosure, adjacent to the first enclosure, containing a gas that is highly transparent to X-rays, to the substantial exclusion of other gases, a wall in the first enclosure having therein an opening large enough to permit X-rays to pass through it and yet small enough that the pressure reducing means can evacuate gas from the first enclosure at least as fast as it enters through the opening at the desired pressure, the target being located close enough to the opening and so positioned as to emit a substantial portion of the X-rays produced toward the opening, to pass through it, a near wall in the second enclosure having therein a portion that is highly transparent to X-rays and positioned adjacent to the opening in the wall of the first enclosure, to permit the X-rays passing through the opening to travel on through the transparent portion of the near wall toward a far wall of the second enclosure located opposite the near wall, and the far wall of the second enclosure, to which the X-rays travel, having a portion that is highly transparent to them, so that the object to which the X-rays are to be provided may be located outside the second enclosure and adjacent to the transparent portion of the far wall and thus receive the X-rays substantially unimpeded by air or other undesired intervening matter.

The apparatus typically comprises also a substantially fluid-tight intermediate enclosure adjoining the first enclosure, having an inner wall of which a portion is in common with a portion of the wall of the first enclosure having the opening therein, having an outer wall approximately parallel to the common wall and with a similar opening therein between and registering with the opening in the common wall and the transparent portion of the near wall of the second enclosure, to permit X-rays to pass therethrough and to travel on to the far wall of the second enclosure; and means for reducing the quantity, and thus the pressure, of gas in the intermediate enclosure to maintain the pressure therein between the pressure in the first enclosure and the pressure in the second enclosure; the opening in the outer wall being small enough that the pressure reducing means can evacuate gas from the intermediate enclosure at least as fast as it enters through the opening at the desired pressure.

The apparatus typically comprises also at least one additional and similar intermediate enclosure between the first and second enclosures, each pair of adjoining intermediate enclosures being located on opposite sides of a common wall and opening therein, and all openings being between and registering with the opening in the wall of the first enclosure and the transparent portion of the near wall of the second enclosure; and means for reducing the quantity, and thus the pressure, of gas in each additional intermediate enclosure to maintain the pressure therein between the pressures in the adjoining enclosures; the opening in each wall being small enough that the pressure reducing means can evacuate gas from each intermediate enclosure at least as fast as it enters through the opening at the desired pressure.

The pressure in each intermediate enclosure typically is maintained approximately midway, logarithmically, between the pressures on the opposite sides of the approximately parallel walls thereof. The spacing between successive approximately parallel walls should be large enough to avoid streaming of the gas therebetween. Typically the spacing between the inner and outer walls of the first intermediate enclosure is about 2 to 10 millimeters, the spacing between the approximately parallel walls of the first additional intermediate enclosure is about ½ to 5 millimeters, and the spacing between the approximately parallel walls of each further additional intermediate enclosure is about 1/10 to 2 millimeters. The openings typically are large enough to permit X-rays to pass through in a cone having a total apex angle of about 1 to 10 degrees.

In some typical embodiments of the invention the second enclosure comprises a light gas drift tube. Typically the gas in the drift tube is helium, hydrogen, or a hydrocarbon; preferably helium; at substantially atmospheric pressure. The distance from the near wall to the far wall in a typical drift tube is about ½ to 5 meters. Typically the transparent portion of the near wall and the transparent portion of the far wall in the drift tube comprise a thin foil that typically comprises essentially beryllium or a low-Z plastic material. The thickness of the foil typically is about 2 to 20 micrometers.

In some typical embodiments of the invention the transparent portion of the near wall of the second enclosure comprises an opening therein, and the apparatus comprises also means for conveying the highly transparent gas to the second enclosure at least as fast as it leaves through the opening, and thus to substantially preclude other gases from entering the second chamber.

Typically the gas conveyed into the second enclosure is helium, hydrogen, or a hydrocarbon; preferably helium; maintained, at least in the vicinity of the transparent portion of the far wall thereof, at a pressure of about 0.9 to 1 atmosphere. Typically the transparent portion of the far wall of the second enclosure comprises a thin foil that typically comprises essentially beryllium or a low-Z plastic material. The thickness of the foil typically is about 2 to 20 micrometers.

Where the gas in the second enclosure, at least in the vicinity of the transparent portion of the far wall thereof, is maintained at approximately the pressure of the ambient air, the transparent portion of the far wall of the second enclosure may comprise an opening therein; and the gas inside the second enclosure can be substantially separated from the air around it; either by a gas curtain passing along the opening; or by the object to which the X-rays are to be provided, or a component associated with the object, placed against the wall and covering the opening.

Apparatus according to the invention for obtaining EXAFS data of a material, typically comprises also spectral dispersive means in the second enclosure so located as to receive X-rays that pass through the opening and to direct the spectrally resolved X-rays on toward the transparent portion of the far wall adjacent to the object to which the X-rays are to be provided, and the object typically comprises recording means. Such apparatus typically comprises also means for positioning a sample of material in the optical path of the X-rays, either in the second enclosure or outside of the second enclosure and between the transparent portion of the far wall and the recording means.

The energy directing means comprises means for directing energy from a laser onto the target, as by focusing the energy onto a spot on the target having a diameter of about 1 to 200 micrometers. Typically the opening in the wall of the first enclosure is about 0.2 to 2 millimeters in diameter, and the distance between the opening in the wall of the first enclosure and the spot on the target is about 0.2 to 5 centimeters. The X-rays produced at the target typically have energies predominantly of about 0.3 to 2 keV.

DRAWINGS

Figure 3:
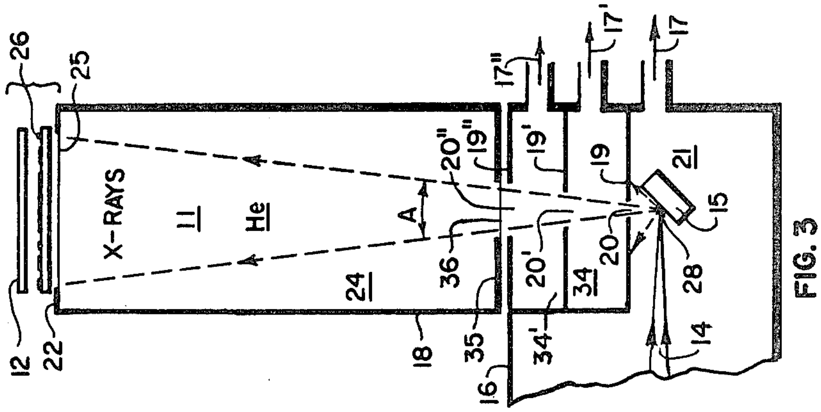
FIG. 3 is a similar view of other typical apparatus according to the present invention.
Figure 1:
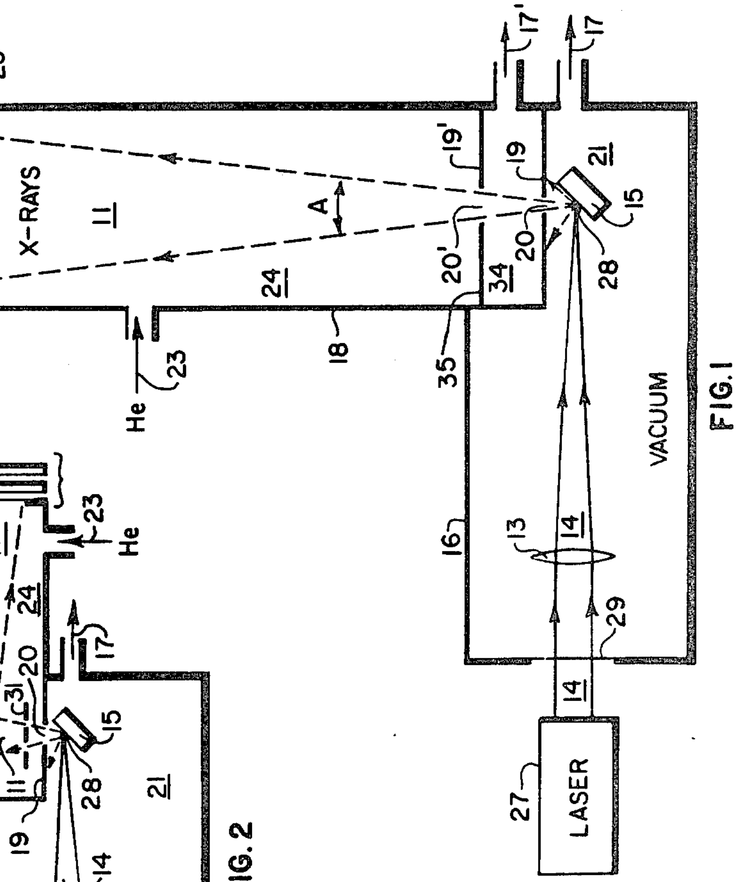
FIG. 1 is a schematic plan view of typical apparatus according to the present invention.
Figure 2:
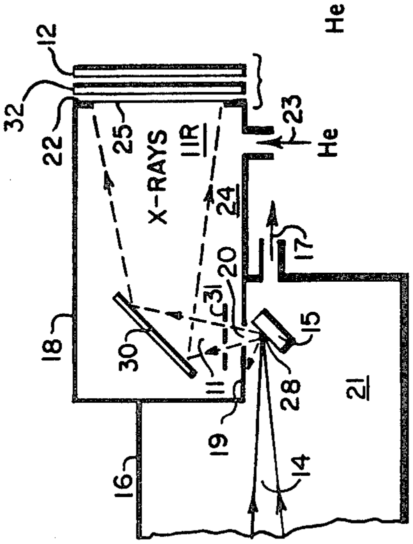
FIG. 2 is a similar view of a typical embodiment of the invention for obtaining BXAFS data of a material.

In FIGS. 2 and 3 the leftmost portion of the apparatus is omitted, to save space, since it is the same as in FIG. 1.

CARRYING OUT THE INVENTION

Referring to the drawings, and especially to FIGS. 1 and 3, typical apparatus according to the present invention for providing X-rays 11 to an object 12 that may be in an ordinary environment such as air at approximately atmospheric pressure comprises means such as a lens 13 for directing energy 14 onto a target 15 to produce X-rays 11 of a selected spectrum and intensity at the target 15, a substantially fluid-tight first enclosure 16 around the target 15, means as indicated by the arrow 17 (such as a vacuum pump, not shown) for reducing the quantity, and thus the pressure, of gas in the first enclosure 16 to maintain the pressure therein substantially below atmospheric pressure (typically less than about 1 torr), a substantially fluid-tight second enclosure 18, adjacent to the first enclosure 16, containing a gas 24 that is highly transparent to X-rays 11, to the substantial exclusion of other gases, a wall 19 in the first enclosure 16 having therein an opening 20 large enough to permit X-rays 11 to pass through it (20) and yet small enough that the pressure reducing means can evacuate gas 21 from the first enclosure 16 at least as fast as it enters through the opening 20 at the desired pressure, the target 15 being located close enough to the opening 20 and so positioned as to emit a substantial portion of the X-rays 11 produced toward the opening 20, to pass through it (20), a near wall 35 in the second enclosure 18 having therein a portion 20' (FIG. 1) or 36 (FIG. 3) that is highly transparent to X-rays 11 and positioned adjacent to the opening 20 in the wall 19 of the first enclosure 16, to permit the X-rays 11 passing through the opening 20 to travel on through the transparent portion 20' or 36 of the near wall 35 toward a far wall 22 of the second enclosure 18 located opposite the near wall 35, and the far wall 22 of the second enclosure 18 to which the X-rays 11 travel having a portion 25 that is highly transparent to them (11), so that the object 12 to which the X-rays 11 are to be provided may be located outside the second enclosure 18 and adjacent to the transparent portion 25 of the far wall 22 and thus receive the X-rays 11 substantially unimpeded by air or other undesired intervening matter.

Where only specific regions of the object 12 are to receive the X-rays 11, as in X-ray lithography, a mask 26 may be placed between the highly transparent portion 25 of the wall 22 and the object 12 to block the X-rays proceeding toward the other regions of the object 12.

The apparatus typically comprises also a substantially fluid-tight intermediate enclosure 34 adjoining the first enclosure 16, having an inner wall 19 of which a portion is in common with a portion of the wall 19 of the first enclosure 16 having the opening 20 therein, having an outer wall 19' approximately parallel to the common wall 19 and with a similar opening 20' therein between and registering with the opening 20 in the common wall 19 and the transparent portion 20' or 36 of the near wall 35 of the second enclosure 18, to permit X-rays 11 to pass therethrough and to travel on to the far wall 22 of the second enclosure 18; and means, as indicated at 17', for reducing the quantity, and thus the pressure, of gas in the intermediate enclosure 34 to maintain the pressure therein between the pressure in the first enclosure 16 and the pressure in the scond enclosure 18; the opening 20' in the outer wall being small enough that the pressure reducing means can evacuate gas from the intermediate enclosure 34 at least as fast as it enters through the open 20' at the desired pressure.

The apparatus typically comprises also at least one additional and similar intermediate enclosure, such as 34' (FIG. 3), between the first enclosure 16 and the second enclosure 18, each pair of adjoining intermediate enclosures, such as 34, 34', being located on opposite sides of a common wall, such as 19', and opening therein, such as 20', and all openings, such as 20', 20'', being between and registering with the opening 20 in the wall 19 of the first enclosure 16 and the transparent portion 36 of the near wall 35 of the second enclosure 18; and means, as indicated at 17'', for reducing the quantity, and thus the pressure, of gas in each additional intermediate enclosure, such as 34', to maintain the pressure therein between the pressures in the adjoining enclosures; the opening, such as 20', 20'', in each wall, such as 19', 19'', being small enough that the pressure reducing means can evacuate gas from each intermediate enclosure, such as 34, 34', at least as fast as it enters through the opening, such as 20' 20'', at the desired pressure.

The pressure in each intermediate enclosure, such as 34, 34', typically is maintained approximately midway, logarithmically, between the pressures on the opposite sides of the approximately parallel walls 19, 19', 19'' thereof. For example, in apparatus as shown in FIG. 3, typical pressures are in the order of about 1 torr in the first enclosure 16, about 10 torr in the intermediate enclosure 34, and about 100 torr in the additional intermediate enclosure 34'. The space between the outer wall 19'' of the additional intermediate enclosure 34' and the near wall 35 of the second enclosure 18 (typically about 1/10 to 2 millimeters), is of course at atmospheric pressure, about 760 torr. As indicated by the arrows 17', 17'', means such as vacuum pumps (not shown) can maintain the proper pressures in the intermediate enclosures 34, 34'. Where more than one intermediate enclosure 34, 34' is provided, a differential evacuation system of the type used for the emission of electron beams into the atmosphere may be desirable.

The spacing between successive approximately parallel walls, 19,19',19'',35 should be large enough to avoid streaming of the gas therebetween. Typically the spacing between the inner wall 19 and the outer wall 19' of the first intermediate enclosure 34 is about 2 to 10 millimeters, the spacing between the approximately parallel walls 19', 19'' of the first additional intermediate enclosure 34' is about ½ to 5 millimeters, and the spacing between the approximately parallel walls of each further additional intermediate enclosure (or space, such as between the walls 19'' and 35 in FIG. 3) is about 1/10 to 2 millimeters. The openings 20,20',20'' (and the window 36) typically are large enough to permit X-rays to pass through in a cone having a total apex angle, A, of about 1 to 10 degrees.

In some typical embodiments of the invention, as in FIG. 3, the second enclosure 18 comprises a light gas drift tube. Typically the gas in the drift tube 18 is helium, hydrogen, or a hydrocarbon; preferably helium; at substantially atmospheric pressure. The distance from the near wall 35 to the far wall 22 in a typical drift tube 18 is about ½ to 5 meters, commonly about ½ to 2 meters. Typically the transparent portion 36 of the near wall 35 and the transparent portion 25 of the far wall 22 in the drift tube 18 comprise a thin foil that typically comprises essentially beryllium or a low-Z plastic material. Preferably the atomic number, Z, of the foil material is not more than about 8. The thickness of the foil typically is about 2 to 20 micrometers.

In some typical embodiments of the invention, as in FIG. 1, the transparent portion of the near wall 35 of the second enclosure 18 comprises an opening 20' therein, and the apparatus comprises also means as indicated by the arrow 23 (such as a pump, not shown) for conveying the transparent gas 24 to the second enclosure 18 at least as fast as it leaves through the opening 20', and thus to substantially preclude other gases from entering the second chamber 18. Typically the gas in the second enclosure, at least in the vicinity of the transparent portion of the far wall thereof, is maintained at a pressure of about 0.9 to 1 atmosphere.

Typically the gas 24 conveyed into the second enclosure 18 is helium, hydrogen, or a hydrocarbon, such as methane; maintained at a pressure of about 0.9 to 1 atmosphere, at least in the vicinity of the transparent portion 25 of the far wall 22 thereof. Preferably the gas 24 comprises essentially helium, which is known to be highly transparent to X-rays as well as substantially inert.

Typically the transparent portion 25 of the far wall 22 of the second enclosure 18 comprises a thin foil 25 that typically comprises essentially beryllium or a low-Z plastic material. The thickness of the foil 25 typically is about 2 to 20 micrometers. Other materials, preferably having atomic numbers, Z, of not more than about 8, may also be used. Where a less transparent material is used it must be very thin.

Where the pressure of the gas 24 in the second enclosure 18 is maintained at approximately atmospheric pressure, the transparent portion 25 of the far wall 22 may be very thin, because the pressure on each side of it is approximately the same. It may even comprise only a gas curtain, rather than a solid material; or the mask 26 in FIG. 1 or the sample 32 in FIG. 2 may be placed against the thick "frame" formed by the wall 22 to substantially separate the gas 24 inside the second enclosure 18 from the air around it. Where an adjacent mask or sample is not used, the object 12 may be placed against the wall 22 to substantially separate the gas 24 inside the second enclosure 18 from the air around it.

Where the gas 24 in the second enclosure 18, at least in the vicinity of the transparent portion 25 of the far wall 22 thereof, is maintained at approximately the pressure of the ambient air, the transparent portion 25 of the wall 22 of the second enclosure 18 may comprise an opening therein; and the gas 24 inside the second enclosure 18 can be substantially separated from the air around it; either by a gas curtain passing along the opening at 25; or by the object 12 to which the X-rays 11 are to be provided, or a component associated with the object 12 (such as the mask 26 in FIGS. 1 and 3 or the sample 32 in FIG. 2), placed against the wall 22 and covering the opening at 25.

As is shown in FIG. 2, typical apparatus according to the invention for obtaining EXAFS data of a material, comprises also spectral dispersive means such as a monochromator 30 in the second enclosure 18 so located as to receive X-rays 11 that pass through the opening and to direct the spectrally resolved X-rays 11R on toward the highly transparent portion 25 of the wall 22 adjacent to the object 12 to which the X-rays 11R are to be provided, and the object 12 typically comprises recording means such as a photographic film 12. Such apparatus typically comprises also means such as a support (not shown) for positioning a sample of material 31 in the optical path of the X-rays 11, 11R, either in the second enclosure 18 as indicated by the dashed line 31, or outside of the second enclosure 18 and between the highly transparent portion 25 of the wall 22 and the recording means 12, as indicated at 32. The latter position 32 usually is more convenient than positions (such as 31) in the second enclosure 18.

Typically the radiant energy 14 is directed to the target 15 in a single pulse in such manner as to produce soft X-rays 11 from the target 15 in a single pulse in such manner as to produce soft X-rays 11 from the target 15 suitable for obtaining the EXAFS spectrum of the material 32, which typically is an element having an atomic number of less than 40.

EXAFS apparatus as in FIG. 2 may comprise also means for moving the surface of the target 15 typically in a rotating and advancing motion (not shown) to provide a helical locus of points on a cylindrical surface of the target 15 travelling through the location of the focal spot 28 where the laser light energy 14 strikes the surface. In such a case the energy 14 typically is directed to the moving target surface at 28 in a series of pulses in such manner as to produce soft X-rays 11 from the target 15 suitable for obtaining the EXAFS spectrum of the material 32.

The X-rays from the target 15 preferably comprise continuum radiation in a selected EXAFS spectral regime of the sample 32. Typically the target 15 comprises essentially an element having a continuum just above the L-lines that includes a selected EXAFS spectral regime of the sample 32. Or the target 15 may comprise a plurality of elements whose lines are spaced closely enough to form virtually a continuum in a selected EXAFS spectral regime of the sample 11. Such a target 15 typically comprises a mixture of elements of adjacent atomic numbers.

The radiant energy typically comprises a laser pulse 14 with a power density of at least about $10^{13}$ watts per square centimeter, and the target 15 typically comprises a solid (typically metal) surface, whereby a surface plasma is formed and raised to the kilovolt temperature regime. Some EXAFS can be obtained, however, in the ultraviolet and ultrasoft X-ray regime using lower power densities down to about $10^{11}$ watts per square centimeter. The laser pulse 14 typically is focused to strike the focal spot 28 on the target 15 about 1 to 200 micrometers in diameter.

Further typical and preferred details of apparatus of the type shown in FIG. 2 for obtaining EXAFS data of a material are contained in U.S. Pat. No. 4,317,994, Mar. 2, 1982, of Philip J. Mallozzi, Harold M. Epstein, Robert E. Schwerzel, and Bernerd E. Campbell, for Laser EXAFS.

The energy directing means typically comprises a lens 13 for directing energy 14, passing through a window 29 in the first enclosure 16, from a laser 27, onto the target 15, as by focusing the energy 14 onto a spot 28 on the target 15 having a diameter of about 1 to 200 micrometers. Typically the opening 20 in the common wall portion 19 is about 0.2 to 2 millimeters in diameter, and the distance between the opening 20 and the spot 28 on the target 15 is about 0.2 to 5 centimeters. The X-rays 11 produced at the target 15 typically have energies predominantly of about 0.3 to 2 keV.

As is explained in detail in the U.S. patent of Mallozzi et al., referred to in the Background section herein, a typical method of producing X-rays for use in the present invention comprises directing radiant energy from a laser onto a target, and conversion efficiency of at least about 3 percent is obtained by providing the radiant energy in a low-power precursor pulse of approximately uniform effective intensity focused onto the surface of the target for about 1 to 30 nanoseconds so as to generate an expanding unconfined coronal plasma having less than normal solid density throughout and comprising a low-density (underdense) region wherein the plasma frequency is less than the laser radiation frequency and a higher-density (overdense) region wherein the plasma frequency is greater than the laser radiation frequency and, about 1 to 30 nanoseconds after the precursor pulse strikes the target, a higher-power main pulse focused onto the plasma for about $10^{-3}$ to 30 nanoseconds and having such power density and total energy that the radiant energy is absorbed in the underdense region and conducted into the overdense region to heat it and thus to produce X-rays therefrom with the plasma remaining substantially below normal solid density and thus facilitating the substantial emission of X-rays in the form of spectral lines arising from nonequilibrium ionization states.

The target typically consists essentially of an element having a high atomic number Z, i.e., an atomic number Z greater than 10. Typically the target consists essentially of iron, calcium, chromium, nickel, aluminum, lead, tungsten, or gold.

The amplitude, duration, and shape of the precursor pulse typically are adjusted to control the intensity and spectral content of the X-rays. The precursor pulse typically comprises about 0.01 to 5 joules (about $10^{10}$ to $10^{12}$ watts per square centimeter) in about 1 to 30 nanoseconds, and strikes the target at an angle of about 20 to 70 degrees from its surface.

The main pulse typically comprises at least 0.1 joule, preferably about 10 to 200 joules in about 1 to 3 nanoseconds.

In a typical embodiment, the target consists essentially of iron and the duration of the precursor pulse is about 8 to 10 nanoseconds.

The electron density in the low-density region of the plasma typically is about $10^{16}$ to $10^{21}$ per cubic centimeter, and in the higher-density region about $10^{19}$ to $10^{25}$ per cubic centimeter. The radiant energy typically is focused onto a spot on the target having a diameter of about 1 to 1000 micrometers. The volume of the plasma typically is about $10^{-6}$ to $10^{-3}$ cubic centimeter, the thickness of the plasma in any direction being about 0.001 to 0.1 centimeter.

For low energy applications the X-rays are emitted predominantly in the form of spectral lines.

The radiant energy may be focused onto a spot on the target having a diameter of about 1 to 100 micrometers, generating a plasma of about the same diameter, to form substantially a point source of X-rays and thus to provide substantially the advantages of stimulated emission of X-rays.

In some embodiments of the invention the composition of the target and the temperature of the plasma are selected to provide a substantial amount of stimulated emission of X-rays.

In other embodiments X-rays are directed to impinge upon a fluorescent target so as to remove inner shell electrons from atoms thereof and thereby create a population inversion.

In a typical method of providing stimulated emission of X-rays by directing radiant energy onto a target to create by means of a pumping mechanism some upper and lower laser levels, the required population inversion is not established by the pumping mechanism alone, but by the combined action of the pumping mechanism and a quenching mechanism that extinguishes the lower laser level at a rate sufficient to establish and continuously maintain the inversion. The pumping mechanism typically comprises excitation by collisions of electrons and ions or by dielectronic recombination. The quenching mechanism typically comprises Auger transitions, Coster-Krönig transitions, or collisions. The radiant energy may be from a laser, or it may comprise a beam of electrons. The pumping mechanism may comprise a beam of electrons.

APPLICABILITY

Apparatus according to the present invention is especially useful for applications wherein it is expensive, time consuming, or otherwise inconvenient to move objects that are to receive soft X-rays into and out of a special environment, such as a vacuum chamber in which the X-rays are produced. Typical applications of this type include laser produced X-ray systems for high resolution lithography, for extended X-ray absorption fine structure (EXAFS) spectroscopy, and for X-ray microscopy.

X-rays usually are produced in a vacuum, but for many purposes it is desirable to apply them in air. For soft X-rays, especially those having photon energies of less than about 5 keV, a problem arises in bringing the X-rays from the vacuum into air, because a window that is thick enough and strong enough to withstand the pressure difference between the vacuum and the air is opaque to the X-rays, except in very small windows. The problem is especially serious in X-ray lithography, where it is desirable to illuminate large areas.

The present invention provides simple, inexpensive convenient means for overcoming the problem of providing X-rays to an object that may be in an ordinary environment such as air at approximately atmospheric pressure.

Apparatus according to this invention is useful and advantageous not only in X-ray lithography but also in laser EXAFS, and especially in fast EXAFS spectroscopy with a single pulse of laser-produced X-rays, or with a plurality of such pulses.

The technique of Extended X-ray Absorption Fine Structure (EXAFS) spectroscopy is becoming an increasingly important tool for the study of chemical structure in samples which lack long-range order, such as amorphous solids, solutions of biologically important materials, and gases. These studies have gained impetus in recent years by virtue of the availability of synchrotron radiation, which provides a continuous and intense spectrum of the soft X-rays required for EXAFS. A synchrotron, however, is an expensive, cumbersome source of X-rays, to which scientists must travel in order to perform their experiments. A laser X-ray source, on the other hand, is relatively compact, inexpensive, and simple to operate and maintain. Furthermore, there are a variety of novel EXAFS experiments which are inherently beyond the capabilities of synchrotron radiation sources. These experiments, which require short pulse width, intense fluxes of low-energy (4 keV) X-rays, and/or a continuum or a closely packed spectral line structure, are ideally suited to laser-produced X-rays.

The EXAFS spectrum of aluminum has been measured with a nanosecond pulse of soft X-rays generated by a laser-produced plasma. This technique provides a practical alternative to synchrotron radiation for the acquisition of EXAFS data. It also provides a unique capability for the analysis of molecular structure in highly transient chemical species.

While the forms of the invention herein disclosed constitute presently preferred embodiments, many others are possible. It is not intended herein to mention all of the possible equivalent forms of ramifications of the invention. It is to be understood that the terms used herein are merely descriptive rather than limiting, and that various changes may be made without departing from the spirit or scope of the invention.

We claim:

1. Apparatus for providing X-rays to an object in an ordinary environment such as air at approximately atmospheric pressure, comprising means for directing energy onto a target to produce X-rays of a selected spectrum and intensity at the target, a substantially fluid-tight first enclosure around the target, means for reducing the quantity, and thus the pressure, of gas in the first enclosure to maintain the pressure therein substantially below atmospheric pressure, a substantially fluid-tight second enclosure, adjacent to the first enclosure, containing a gas that is highly transparent to X-rays, to the substantial exclusion of other gases, a wall in the first enclosure having therein an opening large enough to permit X-rays to pass through it and yet small enough that the pressure reducing means can evacuate gas from the first enclosure at least as fast as it enters through the opening at the desired pressure, the target being located close enough to the opening and so positioned as to emit a substantial portion of the X-rays produced toward the opening, to pass through it, a near wall in the second enclosure having therein a portion that is highly transparent to X-rays and positioned adjacent to the opening in the wall of the first enclosure, to permit the X-rays passing through the opening to travel on through the transparent portion of the near wall toward a far wall of the second enclosure located opposite the near wall, and the far wall of the second enclosure, to which the X-rays travel, having a portion that is highly transparent to them, so that the object to which the X-rays are to be provided may be located outside the second enclosure and adjacent to the transparent portion of the far wall and thus receive the X-rays substantially unimpeded by air or other undesired intervening matter.

2. Apparatus as in claim 1, comprising also a substantially fluid-tight intermediate enclosure adjoining the first enclosure, having an inner wall of which a portion is in common with a portion of the wall of the first enclosure having the opening therein, having an outer wall approximately parallel to the common wall and with a similar opening therein between and registering with the opening in the common wall and the transparent portion of the near wall of the second enclosure, to permit X-rays to pass therethrough and to travel on to the far wall of the second enclosure; and means for reducing the quantity, and thus the pressure, of gas in the intermediate enclosure to maintain the pressure therein between the pressure in the first enclosure and the pressure in the second enclosure; the opening in the outer wall being small enough that the pressure reducing means can evacuate gas from the intermediate enclosure at least as fast as it enters through the opening at the desired pressure.

3. Apparatus as in claim 2, comprising also at least one additional and similar intermediate enclosure between the first and second enclosures, each pair of adjoining intermediate enclosures being located on opposite sides of a common wall and opening therein, and all openings being between and registering with the opening in the wall of the first enclosure and the transparent portion of the near wall of the second enclosure; and means for reducing the quantity, and thus the pressure, of gas in each additional intermediate enclosure to maintain the pressure therein between the pressures in the adjoining enclosures; the opening in each wall being small enough that the pressure reducing means can evacuate gas from each intermediate enclosure at least as fast as it enters through the opening at the desired pressure.

4. Apparatus as in claim 3 wherein the pressure in each intermediate enclosure is maintained approximately midway, logarithmically, between the pressures on the opposite sides of the approximately parallel walls thereof.

5. Apparatus as in claim 3, wherein the spacing between successive approximately parallel walls is large enough to avoid streaming of the gas therebetween.

6. Apparatus as in claim 3, wherein the spacing between the inner and outer walls of the first intermediate enclosure is about 2 to 10 millimeters, and the spacing between the approximately parallel walls of the first additional intermediate enclosure is about ½ to 5 millimeters.

7. Apparatus as in claim 6, wherein the spacing between the approximately parallel walls of each further additional intermediate enclosure is about 1/10 to 2 millimeters.

8. Apparatus as in claim 3, wherein the openings are large enough to permit X-rays to pass through in a cone having a total apex angle of about 1 to 10 degrees.

9. Apparatus as in claim 1, wherein the second enclosure comprises a light gas drift tube.

10. Apparatus as in claim 9, wherein the gas in the drift tube is helium, hydrogen, or a hydrocarbon.

11. Apparatus as in claim 9, wherein the gas in the drift tube is helium.

12. Apparatus as in claim 9, wherein the gas in the drift tube is at substantially atmospheric pressure.

13. Apparatus as in claim 9, wherein the distance from the near wall to the far wall in the drift tube is about ½ to 5 meters.

14. Apparatus as in claim 9, wherein the transparent portion of the near wall in the drift tube comprises a thin foil.

15. Apparatus as in claim 14, wherein the transparent portion of the far wall in the drift tube also comprises a thin foil.

16. Apparatus as in claim 15, wherein the foil comprises essentially beryllium or a low-Z plastic material.

17. Apparatus as in claim 16, wherein the thickness of the foil is about 2 to 20 micrometers.

18. Apparatus as in claim 1, wherein the transparent portion of the near wall of the second enclosure comprises an opening therein, and the apparatus comprises also means for conveying the highly transparent gas to the second enclosure at least as fast as it leaves through the opening, and thus to substantially preclude other gases from entering the second chamber.

19. Apparatus as in claim 18, wherein the gas conveyed into the second enclosure is helium, hydrogen, or a hydrocarbon.

20. Apparatus as in claim 18, wherein the gas conveyed into the second enclosure is helium.

21. Apparatus as in claim 18, wherein the gas in the second enclosure, at least in the vicinity of the transparent portion of the far wall thereof, is maintained at a pressure of about 0.9 to 1 atmosphere.

22. Apparatus as in claim 21, wherein the transparent portion of the far wall of the second enclosure comprises a thin foil.

23. Apparatus as in claim 22, wherein the foil comprises essentially beryllium or a low-Z plastic material.

24. Apparatus as in claim 23, wherein the thickness of the foil is about 2 to 20 micrometers.

25. Apparatus as in claim 1, wherein the gas in the second enclosure, at least in the vicinity of the transparent portion of the far wall thereof, is maintained at approximately the pressure of the ambient air.

26. Apparatus as in claim 25; wherein the transparent portion of the far wall of the second enclosure comprises an opening therein; and the gas inside the second enclosure is substantially separated from the air around it; either by a gas curtain passing along the opening; or by the object to which the X-rays are to be provided, or a component associated with the object, placed against the wall and covering the opening.

27. Apparatus as in claim 1 for obtaining EXAFS data of a material, comprising also spectral dispersive means in the second enclosure so located as to receive X-rays that pass through the opening and to direct the spectrally resolved X-rays on toward the transparent portion of the far wall adjacent to the object to which the X-rays are to be provided, and wherein the object comprises recording means.

28. Apparatus as in claim 27, comprising also means for positioning a sample of material in the optical path of the X-rays.

29. Apparatus as in claim 28, wherein the sample is positioned in the second enclosure.

30. Apparatus as in claim 28, wherein the sample is positioned outside of the second enclosure and between the transparent portion of the far wall and the recording means.

31. Apparatus as in claim 1, wherein the energy directing means comprises means for directing energy from a laser onto the target.

32. Apparatus as in claim 1, wherein the energy directing means comprises means for focusing the energy onto a spot on the target having a diameter of about 1 to 200 micrometers.

33. Apparatus as in claim 1, wherein the opening in the wall of the first enclosure is about 0.2 to 2 millimeters in diameter.

34. Apparatus as in claim 1, wherein the distance between the opening in the wall of the first enclosure and the spot on the target is about 0.2 to 5 centimeters.

35. Apparatus as in claim 1 wherein the X-rays produced at the target have energies predominantly of about 0.3 to 2 keV.

* * * * *